(12) United States Patent
Böttger et al.

(10) Patent No.: US 9,683,317 B2
(45) Date of Patent: Jun. 20, 2017

(54) TWO-PLY WOVEN STRUCTURE WITH HIGH-STRENGTH AND THERMOPLASTIC FIBRES

(71) Applicant: TEIJIN ARAMID GMBH, Wuppertal (DE)

(72) Inventors: Christian Böttger, Remscheid (DE); Rüdiger Hartert, Wuppertal (DE)

(73) Assignee: TEIJIN ARAMID GMBH, Wuppertal (DE)

( * ) Notice: Subject to any disclaimer, the term of this patent is extended or adjusted under 35 U.S.C. 154(b) by 3 days.

(21) Appl. No.: 14/768,365

(22) PCT Filed: Feb. 19, 2014

(86) PCT No.: PCT/EP2014/053177
§ 371 (c)(1),
(2) Date: Aug. 17, 2015

(87) PCT Pub. No.: WO2014/128140
PCT Pub. Date: Aug. 28, 2014

(65) Prior Publication Data
US 2016/0017522 A1 Jan. 21, 2016

(30) Foreign Application Priority Data
Feb. 19, 2013 (EP) .................................. 13155749

(51) Int. Cl.
*D03D 1/00* (2006.01)
*B29C 70/46* (2006.01)
(Continued)

(52) U.S. Cl.
CPC ............ *D03D 1/0052* (2013.01); *B29C 70/22* (2013.01); *B29C 70/465* (2013.01); *B32B 5/26* (2013.01);
(Continued)

(58) Field of Classification Search
CPC .................. B29C 70/22; B29C 70/465; B29K 2995/0089; B32B 5/26; D03D 11/00;
(Continued)

(56) References Cited

U.S. PATENT DOCUMENTS 4,410,385 A * 10/1983 Murphy ................ D06M 23/06
156/181
5,168,006 A 12/1992 Inoguchi et al.
(Continued)

FOREIGN PATENT DOCUMENTS

DE 10 2011 102342 A1 11/2012
EP 0 408 830 A1 1/1991
(Continued)

OTHER PUBLICATIONS

Walz et al. "TEXTIL-PRAXIS," pp. 330-335 and pp. 366-370, Issue 2, 1947.
(Continued)

*Primary Examiner* — Arti Singh-Pandey
(74) *Attorney, Agent, or Firm* — Oliff PLC

(57) ABSTRACT

A penetration-resistant article includes at least one woven structure that has thermoplastic fibers and high-strength fibers, wherein the high-strength fibers have a strength of at least 100 MPa according to ASTM D-885, and a second weave of the woven structure has high-strength fibers. The thermoplastic fibers lie on the second weave and are connected to the second weave by way of at least one warp and/or weft thread. The thermoplastic fibers account for a proportion by weight with respect to the weight of the double weave of 5 to 35%. A method for producing such a woven structure is also described.

22 Claims, 7 Drawing Sheets

(51) Int. Cl.
  *B29C 70/22* (2006.01)
  *D03D 11/00* (2006.01)
  *F41H 5/04* (2006.01)
  *B32B 5/26* (2006.01)

(52) U.S. Cl.
  CPC ........... *D03D 11/00* (2013.01); *F41H 5/0485* (2013.01); *B29K 2995/0089* (2013.01); *D10B 2321/021* (2013.01); *D10B 2321/022* (2013.01); *D10B 2331/02* (2013.01); *D10B 2331/021* (2013.01); *D10B 2331/04* (2013.01); *D10B 2331/10* (2013.01); *D10B 2501/04* (2013.01); *D10B 2505/02* (2013.01)

(58) Field of Classification Search
  CPC ........... D03D 1/0052; D10B 2321/021; D10B 2321/022; D10B 2331/02; D10B 2331/021; D10B 2331/04; D10B 2331/10; D10B 2501/04; D10B 2505/02; F41H 5/0485; H01R 13/5825; H01R 13/5225; H01R 13/6275; H01R 13/6278; H01R 13/62911; H01R 13/645
  See application file for complete search history.

(56) References Cited

U.S. PATENT DOCUMENTS

| | | | |
|---|---|---|---|
| 6,990,886 B2* | 1/2006 | Citterio | ............ B32B 5/08 2/2.5 |
| 2003/0228815 A1 | 12/2003 | Bhatnagar et al. | |
| 2007/0099526 A1 | 5/2007 | Heerden et al. | |
| 2014/0227474 A1* | 8/2014 | Cramer | ............ D03D 11/00 428/86 |
| 2016/0016393 A1* | 1/2016 | Gabrisch | ............ B32B 5/26 89/36.02 |

FOREIGN PATENT DOCUMENTS

EP    0 417 827 A1    3/1991
WO    2012/159723 A2    11/2012

OTHER PUBLICATIONS

May 13, 2014 Search Report issued in International Patent Application No. PCT/EP2014/053177.

* cited by examiner

TWO-PLY WOVEN STRUCTURE WITH HIGH-STRENGTH AND THERMOPLASTIC FIBRES

BACKGROUND

The application relates to a penetration-resistant article having a woven fabric structure, said fabric structure having high-strength fibres with a strength of at least 1100 MPa in accordance with ASTM D-885 and thermoplastic fibres.

Until now a pre-impregnation process (prepreg) has been used for the production of penetration-resistant articles made from woven layers of high-strength fibres during which a film or resin was applied to a woven layer. After the calendering step, several pre-impregnated woven layers were stacked and compacted under high temperature and pressure to create the desired material, e.g., reinforcing plates. This method caused several problems. The material calendered onto the fabric of high-strength fibres contains solvents. Under normal atmospheric conditions, the solvent diffuses rapidly so that the resin film also ages. In order to avoid this, cooled transport and cooled storage of the pre-impregnated fabrics are necessary. Furthermore, the drapability of the woven layers in small radii is low. The calendering of the woven layers is also very cost-intensive. The additional product step costs time and energy and a release film is required between machine and resin film in order to prevent sticking of the coated material to parts of the production machines, but also to the next roll layer (when producing roll stock). The pre-impregnation process can be avoided by a textile engineering solution in which a thermoplastic yarn is woven together with the high-strength yarns so that during compaction and forming of the article made from several fabric layers under increased temperature and pressure, the thermoplastic becomes fluid and joins the woven layers together like an adhesive.

Articles made from several woven layers, also for ballistic protection, are known. The use of hybrid fabrics of thermoplastic and high-strength fibres in one of these woven layers is also known.

U.S. Pat. No. 5,168,006 describes a woven fabric in which thermoplastic and high-strength fibres are woven together before being compacted to create mouldable materials. Here the two fibres are woven in parallel as warp and weft threads, respectively, in a warp beam system. The fabric is characterized by a high thermoplastics content.

The avoidance of the pre-impregnation process by textile engineering measures is also known.

EP0417827 describes a woven fabric of thermoplastic fibres and high-strength fibres that can be used as a pre-impregnated material for the production of, for example, protective clothing (helmets). Pretreated thermoplastic fibres are joined with the high-strength fibres to form fibre bundles that are subsequently woven, with the high-strength fibres accounting for preferably 40-60% of the fabric.

The articles described in the published literature all have the disadvantage, however, of only a low penetration-resistant effect and the drapability of the articles is also low. The latter effect is predominantly attributable to the high thermoplastic content of the woven fabric.

Document DE 10 2011 102 342 describes a multi-layer textile with at least one double layer. A first ply of this multi-layer textile contains reinforcing threads while a second ply of the multi-layer textile contains matrix threads. The reinforcing threads should have a structured arrangement in the multi-layer textile [0009] so that they form, for example, a non-crimp fabric. The two plies are joined together using binder yarns. The document does not describe that the reinforcing threads arranged in the structure form a woven fabric of reinforcing threads. The advanced synchron weave structure (described in EP 0408830) is mentioned in paragraph [0016] as a preferred embodiment of the multi-layer textile. In this structure, the reinforcing threads form two non-crimp fabric layers that cross one another and the matrix threads hold the reinforcing threads together by interlaced upper weft threads or lower weft threads. The matrix material is consequently located between the reinforcing threads. The objective of the invention according to DE 10 2011 102 432 is the ideal uniform distribution of the matrix threads so that when the matrix material melts, each filament of the reinforcing fibres is wetted with the matrix material. In order to achieve this, the reinforcing threads must not have the form of a woven fabric, as otherwise a uniform distribution of the matrix material at the crossing points of the fabric would not be possible. Furthermore, the infiltration of the matrix material into such a fabric of reinforcing fibres is more difficult. The flat textile described in this document can be used as an outer skin for aircraft, motor vehicles or other vehicles (paragraph [0022]). Due to the fact that the filaments of the reinforcing fibres are uniformly wetted by the matrix material, the ballistic retention capacity would be significantly reduced so that the material of DE 10 2011 102 432 cannot be used for anti-ballistic purposes.

SUMMARY

The object of the present application is therefore to eliminate or at least reduce the disadvantages described by the prior art.

The object is achieved by a penetration-resistant article comprising at least a woven fabric structure having thermoplastic fibres and high-strength fibres, with the high-strength fibres having a strength of at least 1100 MPa in accordance with ASTM D-885, where the high-strength fibres together form a second woven fabric of the woven fabric structure and the thermoplastic fibres lie on the second fabric and are linked to the second fabric by at least one warp thread and/or weft thread, with the thermoplastic fibres having a percentage by weight relative to the weight of the double fabric of 5 to 35%.

DETAILED DESCRIPTION

Figure 1:
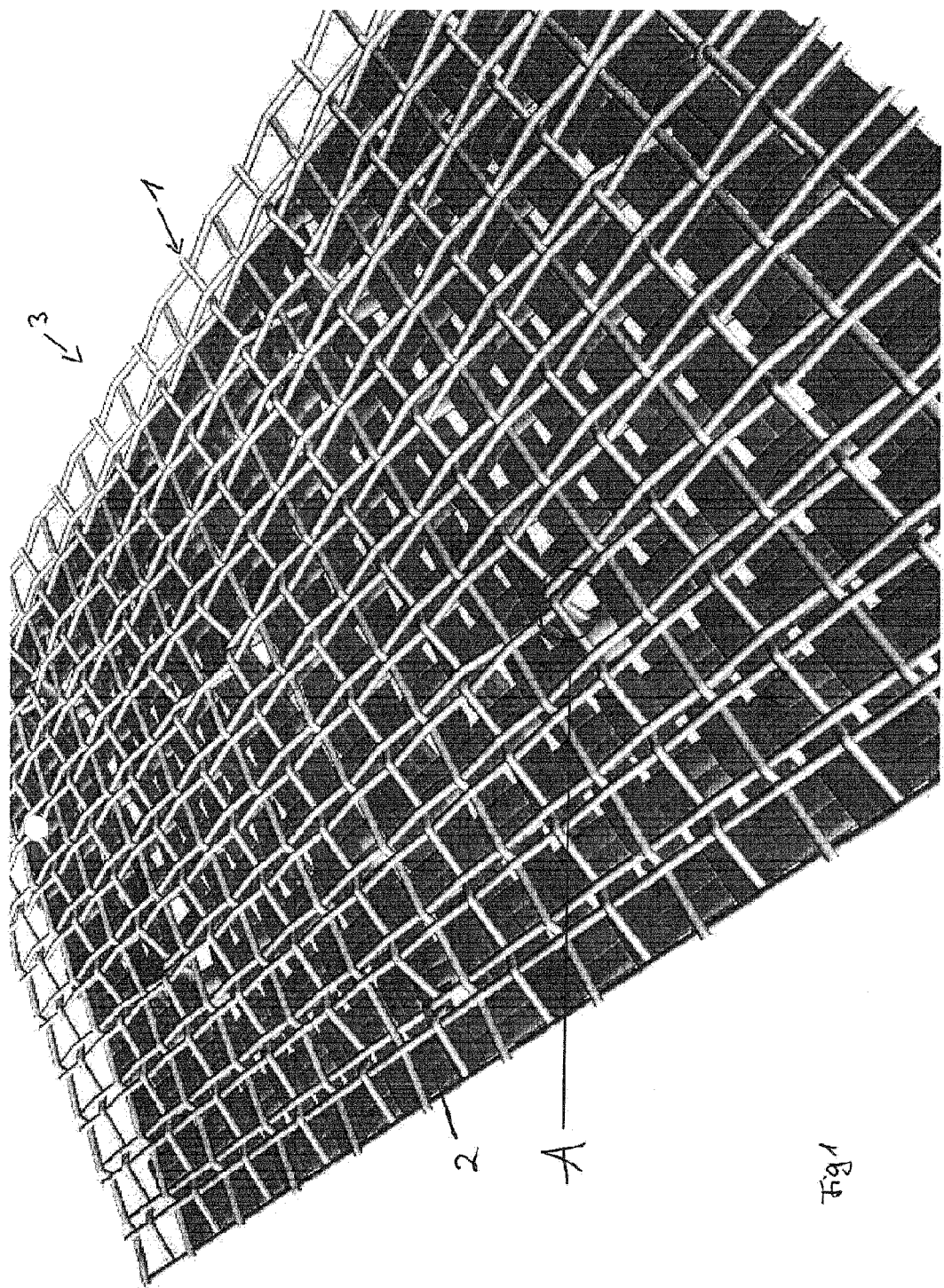
FIGS. 1-4 show a three-dimensional representation of one possible embodiment of a woven fabric structure with tying points.

The thermoplastic fibres preferably exist in the woven fabric structure in the form of a first woven fabric or in the form of a non-crimp fabric. If the thermoplastic fibres exist in the form of a non-crimp fabric, the thermoplastic fibres preferably form a unidirectional non-crimp fabric. A unidirectional non-crimp fabric should be understood as meaning when fibres (monofilaments or multifilaments) are arranged roughly parallel to one another in one plane.

In the embodiment in which the thermoplastic fibres exist in the form of a first woven fabric, the first and second fabrics of the woven fabric structure are preferably joined to the second fabric (of high-strength fibres) by warp and/or weft threads of the first fabric layer (i.e., by thermoplastic fibres). This means that the fabric of high-strength fibres is joined to the fabric of thermoplastic fibres by thermoplastic fibres.

In the embodiment in which the thermoplastic fibres exist as a non-crimp fabric (preferably as a unidirectional non-crimp fabric) in the woven fabric structure, a connection is made preferably by at least one warp and/or weft thread of the second fabric. This means that the fabric of high-strength fibres is joined to the non-crimp fabric of thermoplastic fibres by warp and/or weft threads of high-strength fibres.

In both embodiments (with the thermoplastic fibres existing as a woven fabric or as a non-crimp fabric), the second fabric of high-strength fibres is joined to the thermoplastic fibres by a woven connection. No additional binding thread or additional non-textile connecting agents (for example adhesive films or foils) are required for the connection between the second fabric layer and the thermoplastic fibres. The thermoplastic fibres are advantageously not woven into the fabric of high-strength fibres so that the high-strength fibres can move within their fabric layer. This significantly improves the ballistic retention capacity of the high-strength fibres. It is furthermore advantageous that the thermoplastic fibres lie on the fabric of high-strength fibres. During the melting of the thermoplastic fibres, a thin coating of thermoplastic material is formed on the surface of the fabric layer of high-strength fibres, but the thermoplastic material does not infiltrate the fabric layer of high-strength fibres (i.e., there is no impregnation of the fabric layer of high-strength fibres with the molten thermoplastic material). This effect also improves or retains the ballistic retention capacity of the high-strength fibres in the fabric (controlled delamination on impact is possible).

In order to simplify reading of the description, the first woven fabric of the woven fabric structure is also referred to in the further description as the first fabric layer (thermoplastic fabric layer) and the second woven fabric of the woven fabric structure also as the second fabric layer (high-strength fabric layer).

The woven fabric structure forms a double fabric. A double fabric is to be understood as two woven fabric layers, each of which is in itself woven, but which are in contact with one another via tying points. With a double fabric layer there are two woven fabric layers which, for example, can lie on one another. A double fabric should also be understood, however, as a woven fabric and a further layer of unidirectional fibres lying on this woven fabric layer and joined to the latter by a warp and/or weft thread of the woven layer. In such cases the double fabric is referred to as a 1.5 double fabric.

In the further description, the terms woven fabric structure and double fabric are used synonymously.

The thermoplastic fibres have a percentage by weight referred to the weight of the double fabric of preferably 8 to 20%, more preferably of 10 to 15%.

The cited percentage by weight of the thermoplastic fibres thereby results preferably almost exclusively from the thermoplastic fibres of the first woven fabric layer or from the first non-crimp fabric layer of thermoplastic fibres (thermoplastic layer). The thermoplastic share of the total weight of the double fabric should be selected low in order to allow a high proportion of high-strength fibres. The primary function of the thermoplastic layer lies in the bonding of the second fabric layer of high-strength fibres to other (further) textile layers to form a penetration-resistant article. The function of the second fabric of high-strength fibres, on the other hand, is predominantly to influence the strength and elasticity of the article. When using the woven fabric structure in an antiballistic article, the second fabric of high-strength fibres determines the ballistic capacity of the antiballistic article.

The high-strength fibres preferably have a share of the total weight of the double fabric of 65-95%, more preferably of 80-95% and most preferably of at least 85-90%. The percentage by weight of the high-strength fibres preferably results almost exclusively from the high-strength fibres of the second fabric layer (high-strength fabric layer). Consequently, the high-strength fibres with a strength of at least 1100 MPa in accordance with ASTM D-885 are present almost exclusively, and most iii preferably exclusively, in the second fabric of the double fabric.

The second fabric of high-strength fibres is preferably joined to the thermoplastic fibres via tying points. An area of 100 $cm^2$ of the double fabric preferably has 20 to 150 tying points between the thermoplastic fibres and the high-strength fabric. An area of 100 $cm^2$ of the double fabric more preferably has 30 to 50 tying points between the thermoplastic fibres and the high-strength fabric.

When the thermoplastic fibres take the form of a first woven fabric in the woven fabric structure, the two fabric layers of the double fabric are preferably in contact with one another via their warp and/or weft threads so that no further additional contact threads have to be used. For example, every fourth warp thread of the first fabric layer (thermoplastic fabric layer) can be woven at discrete points with the weft thread of the second fabric layer (high-strength fabric layer). These discrete tying points can recur regularly or randomly in the double fabric.

The tying points for joining the thermoplastic fibres to the second fabric layer (high-strength fabric layer) are preferably interlayer connections when the high-strength fibres form a first woven layer. A weft-to-warp connection should be understood as a weft thread of a lower fabric layer being joined to a warp thread of an upper fabric layer. For example, the first and second fabric layers can be joined by connecting weft threads of the second fabric layer (high-strength fabric layer) to warp threads of the first fabric layer (thermoplastic fabric layer). A warp-to-weft connection should be understood where there is a connection between the warp of a lower fabric layer and the weft of an upper fabric layer. For example the first and second fabric layer can be joined by warp-to-weft connections with warp threads of the second fabric layer (high-strength fabric layer) being joined to weft threads of the first fabric layer (thermoplastic fabric layer).

The number of tying points per unit area in the double fabric has an influence on the drapability of the ballistic element. The fewer tying points there are between the first fabric layer (thermoplastic fabric layer) and the second fabric layer (high-strength fabric layer) in the double fabric, the more drapable the double fabric is before and during compaction. The separation of thermoplastic material and high-strength fibres, however, has a greater influence on the drapability than the number of tying points.

If the thermoplastic fibres take the form of a non-crimp fabric, and preferably in the form of a unidirectional non-crimp fabric, then the second fabric layer (high-strength fibres) is preferably joined to the thermoplastic fibres by at least one warp and/or weft thread of the second fabric. At least one thermoplastic fibre is thereby preferably joined to the second fabric by one warp and/or weft thread. Here again, the drapability is also influenced by the number of connections of the thermoplastic non-crimp fabric layer and the woven fabric layer of high-strength fibres. Here again, however, the separation of thermoplastic fibres and high-strength fibres has the greatest effect on the drapability of the fabric structure.

It has unexpectedly proved favourable for the ballistic application if the thermoplastic (i.e., the thermoplastic fibres) is predominantly located only between the layers of high-strength fibres (second fabric layer) and not between the high-strength fibres proper. The reason for this is that the impregnation of the high-strength fibres with the thermoplastic material reduces the energy absorption of the high-strength fibres, hence reducing the penetration-resistant effect. A high percentage by weight of high-strength fibres has proved important here for the physical properties of the fabric, in particular for the ballistic/penetration-resistant protection.

In all articles mentioned to date in the prior art, thermoplastic and high-strength fibres lie parallel in a fabric so that on heating and compacting, the thermoplastic is also distributed among the high-strength fibres. The high-strength fibres in the resulting article can then move less and therefore absorb less energy on impact before the fibres are destroyed. Furthermore the percentage by weight of the thermoplastics in the fabric is relatively high, so that the weight of the finished article is also high. A disadvantage of the conventional connections of fabrics using thermoplastic material is that the connection between thermoplastic material and fabric is often chosen to be very rigid (for example, through a high thermoplastics content and a large number of tying points between thermoplastic and fabric). With anti-ballistic materials, however, such a rigid connection is a disadvantage, as a controlled delamination is desirable for energy transformation (in the event of bombardment). With a rigid composite, the bullet would penetrate the composite and thereby lose less energy than if a controlled delamination were to take place.

A thermoplastic polymer is preferably used as the material for the thermoplastic fibres. Polyamide, polyester or polyurethane are particularly preferably used as the material for the thermoplastic fibres. Particularly preferably the thermoplastic fibres are made partly or completely of polyamide, in particular polyamide 11 or polyamide 12 (PA-12).

In a preferred embodiment, the first woven fabric layer or the first non-crimp fabric layer (thermoplastic layer) is made completely of polyamide, polyester or polyurethane, more preferably polyamide, especially polyamide 11 or polyamide 12 (PA-12). The thermoplastic fibres mentioned can take the form of monofilaments and/or multifilaments in the first layer (thermoplastic layer) of the double fabric. The use of PA-12 has the advantage that it is chemically inert and absorbs little moisture. This makes the later compacting easier and less energy-intensive. Furthermore, the melting point of PA-12 is similar to that of the resin used in the pre-impregnation process so that the same machines can be used for compacting the double fabric as were previously used with the pre-impregnated fabrics. Furthermore, PA-12 is an inexpensive starting material. PA 12 also has an advantageously high heat resistance up to approx. 160° C.

If the thermoplastic fibres in the first layer have the form of a woven fabric, this first fabric layer preferably has a fabric density according to Walz of, or more preferably below, 30%. The fabric density according to Walz of the first fabric layer is particularly preferably 20% or less, and most preferably 15% or less.

Furthermore, the second fabric layer (high-strength fabric layer) of the double fabric layer has a fabric density according to Walz of preferably more than 30%. More than 30% here means that 30% is not included. The second fabric layer has a fabric density according to Walz of particularly preferably more than 45%, most preferably more than 50%.

The fabric density according to Walz (DG) was calculated as follows:

$$DG=(d_k+d_s)^2 \cdot f_k \cdot f_s$$

Where:
$d_k$=Substance diameter of the warp yarn in mm;
$d_s$=Substance diameter of the weft yarn in mm;
$f_k$=Warp threads per cm
$f_s$=Weft threads per cm
The substance diameter $d_k$ or $d_s$ of the yarns is calculated as follows:

$$d = \frac{\sqrt{\text{linear density}}}{88.5 \times \sqrt{\text{density}}}$$

where d is either $d_k$ or $d_s$ and the linear density of the corresponding yarn is entered in dtex and the density of the yarn in g/cm³.

The fabric density calculated using the equation applies to fabrics with plain weave. If weaves other than the plain weave are used, a weave correction factor has to be included in the equation. For fabrics with special types of weave, for example, the following values are entered as the weave correction factor:

| | |
|---|---|
| Hopsack weaves 2:2 | 0.56 |
| Twill weaves 2:1 | 0.70 |
| Twill weaves 2:2 | 0.56 |
| Twill weaves 3:1 | 0.56 |
| Twill weaves 4:4 | 0.38 |
| Satin weave 1:4 | 0.49 |
| Satin weave 1:5 | 0.44 |

The fabric density according to Walz DG calculated using the equation is multiplied by these correction factors. The fabric density is given in %.

How the fabric density for other weave types (for which the correction factor was not given) can be determined is described in "Textil-Praxis", issue 2, 1947 (Robert Kochhammer Verlag, Stuttgart) on pages 330 to 335 and 366 to 370 by the authors F. Walz and J. Luibrand.

If the thermoplastic fibres in the first layer have the form of a woven fabric, then this first fabric layer (thermoplastic fabric) and/or the second fabric layer (high-strength fabric) preferably each have the same numbers of threads in warp and weft. This means that a symmetrical weave exists within the fabrics where the number of warp threads is equal to the number of weft threads.

The high-strength fibres have a strength of at least 1100 MPa in accordance with ASTM D-885, preferably a strength of more than 2000 MPa in accordance with ASTM D-885.

The high-strength fibres are preferably fibres of aramids (preferably poly(p-phenylene terephthalamide) or aramid copolymers, fibres of polyethylene with ultra-high molecular weight, fibres of polypropylene with ultra-high molecular weight, polybenzoxazole fibres or polybenzothiazole fibres. Especially preferably the second fabric layer (high-strength fabric layer) comprises aramid fibres, such as Twaron® fibres from Teijin Aramid. Most preferably over 90% of the second fabric layer (high-strength fabric layer) comprises aramid fibres.

The aramid fibres preferably take the form of a multifilament yarn in the second fabric layer (high-strength fabric layer).

In the embodiment in which the thermoplastic fibres take the form of a first woven fabric, the thermoplastic fibres or threads of the first fabric layer (thermoplastic fabric layer) have the same average take-up in the fabric as the threads forming the second fabric layer (high-strength fabric layer). An average take-up is to be understood as when the average value for the weaving-related change in length of the warp threads and/or weft threads in the first fabric layer corresponds roughly to the average value for the weaving-related change in length of the warp threads and/or weft threads in the second fabric layer. The threads joining the two fabric layers are not included in the calculation of the average take-up. The average thread length of the warp threads in the first fabric layer and the average thread length of the warp threads in the second fabric layer are preferably roughly the same. Also preferable is that the average thread length of the weft threads of the first fabric layer is roughly the same as the average thread length of the weft threads of the second fabric layer. In another embodiment, the warp threads of one fabric layer (first or second fabric layer) have an average take-up that corresponds roughly to the average take-up of the weft threads of the same fabric layer (first or second fabric layer). This means that the average length of the warp threads is roughly the same as the average length of the weft threads in a fabric layer (first or second fabric layer). Roughly the same means that the length of the threads varies by only approx. 20 to 30%. In the double fabric layer, the fabric layers relative to one another can have roughly the same average take-up and each fabric layer can have roughly the same average take-up. The average take-up is determined in accordance with the international standard ISO 7211/3 with 2 cN/tex being chosen as the pretension for the fibres of the high-strength fabric layer and 0.5 cN/tex for the fibres of the thermoplastic fabric layer.

In the embodiment in which the thermoplastic fibres take the form of a non-crimp fabric, more preferably the form of a unidirectional non-crimp fabric, the warp and/or weft threads of the high-strength fabric layer all have roughly the same average take-up. More preferably, all the warp threads of the second fabric layer have roughly the same average take-up, and all the weft threads of the second fabric layer have roughly the same average take-up. Such a roughly-the-same average take-up is possible when the connections to the thermoplastic fibres are distributed symmetrically over the second fabric. The explanation already given applies here to the term average take-up.

A further object of the application is a method for the production of a penetration-resistant article comprising at least a woven fabric structure having thermoplastic fibres and high-strength fibres, with the high-strength fibres having a strength of at least 1100 MPa in accordance with ASTM D-885, said fabric structure having a second woven fabric of high-strength fibres and the thermoplastic fibres lie on the second fabric and are joined to the second fabric by at least one warp and/or weft thread, said thermoplastic fibres having a percentage by weight relative to the weight of the double fabric of 5 to 35%.

In an embodiment in which the thermoplastic fibres take the form of a first woven fabric in the woven fabric structure, it is preferable in the production of the double fabric layer (fabric structure) for the first and second fabrics to each be woven on a separate warp beam.

An area of 100 $cm^2$ of the double fabric is preferably produced with 20 to 150 tying points between the thermoplastic fibres and the second fabric.

The second fabric (high-strength fabric layer) is preferably woven in a plain, hopsack or twill weave.

At least one of the woven fabric structures described is preferably compacted with at least one further textile layer under pressure and at a temperature equal to or higher than the melting point of the thermoplastic fibre and below the melting point of the high-strength fibre without pre-impregnation to form a sheet.

The further textile layer should preferably be produced by textile engineering techniques and can, for example, be a knitted, needled, raschel-knit or woven layer. The further textile layer can also be a multiaxial fabric.

The further textile layer preferably comprises high-strength fibres with a strength of at least 1100 MPa in accordance with ASTM D-885. More preferably the further textile layer is made of at least 80%, most preferably 90% of the said high-strength fibres.

The high-strength fibres of the further textile layer are preferably aramid fibres, fibres of polyethylene with ultra-high molecular weight, fibres of polypropylene with ultra-high molecular weight, polybenzoxazole fibres or polybenzothiazole fibres.

The further textile layer is preferably a further layer of the woven fabric structure as described in this patent application.

One or a plurality of the fabric structures described (compacted, for example, with one or a plurality of further textile layers) can be used in an antiballistic article packed (for example, welded) in a plastic film. The film can, for example, be a highly elastic ester- or ether-based polyurethane film. The film is preferably black and has a thickness of 75 to 150 μm. One example of such a film is Walopur® Platilon® U from epurexfilms (Bayer). However, a translucent, but UV-impermeable film can also be used into which the fabric structures (with or without further textile layer) can be placed or in which these can be sheathed (for example, by welding). Translucent, UV-impermeable films allow the fabric structure to be seen from outside the sheath. If, for example, an antiballistic package is made from a plurality of compacted fabric structures and further textile layers, it is possible that this antiballistic package has a strike side and a body side. In order to identify the different sides, one or two notices (for example, labels) can be attached to one or both sides of the antiballistic package. These notices are then still visible from the outside when the antiballistic package is inside the film. If the antiballistic package is inserted into the bullet-proof jacket together with the film, then it can be advantageously ensured that the antiballistic package is correctly positioned inside the bullet-proof jacket. The film preferably forms a sheath around one or a plurality of the fabric structures and protects these from moisture, soiling and UV light. Epurex blanc, Epurex light blue, Epurex dark blue, Epurex light yellow, Epurex yellow or Epurex dark yellow (Bayer), for example, can be used as the translucent film.

The penetration-resistant article according to the main claim and sub-claims can be used to produce penetration-resistant protective clothing, such as jackets, helmets, shields or armour elements. The penetration-resistant article should preferably have stab-proof and/or antiballistic properties.

Embodiments of the application are illustrated by means of FIGS. 1 to 7.

FIG. 1 shows an example of one possible embodiment of the application in which the thermoplastic fibres form a first woven fabric layer 1 and the high-strength fibres form a second woven fabric layer 2 in a woven fabric structure 3. The fabric structure 3 is referred to hereinafter also as a double fabric. In the double fabric 3, tying points have been formed at regularly recurring points (A) between the first fabric 1 and the second fabric 2 below it. The first fabric 1 can, for example, be made of thermoplastic fibres 4, and the second fabric 2 of high-strength fibres 5 such as aramid (preferably para-aramid). The thermoplastic fibres 4 consequently lie on the second fabric 2. As can be seen in FIG. 1, the second fabric 2 has a symmetrical structure, i.e., the number of warp threads is equal to the number of weft threads in the second fabric 2.

Figure 2:
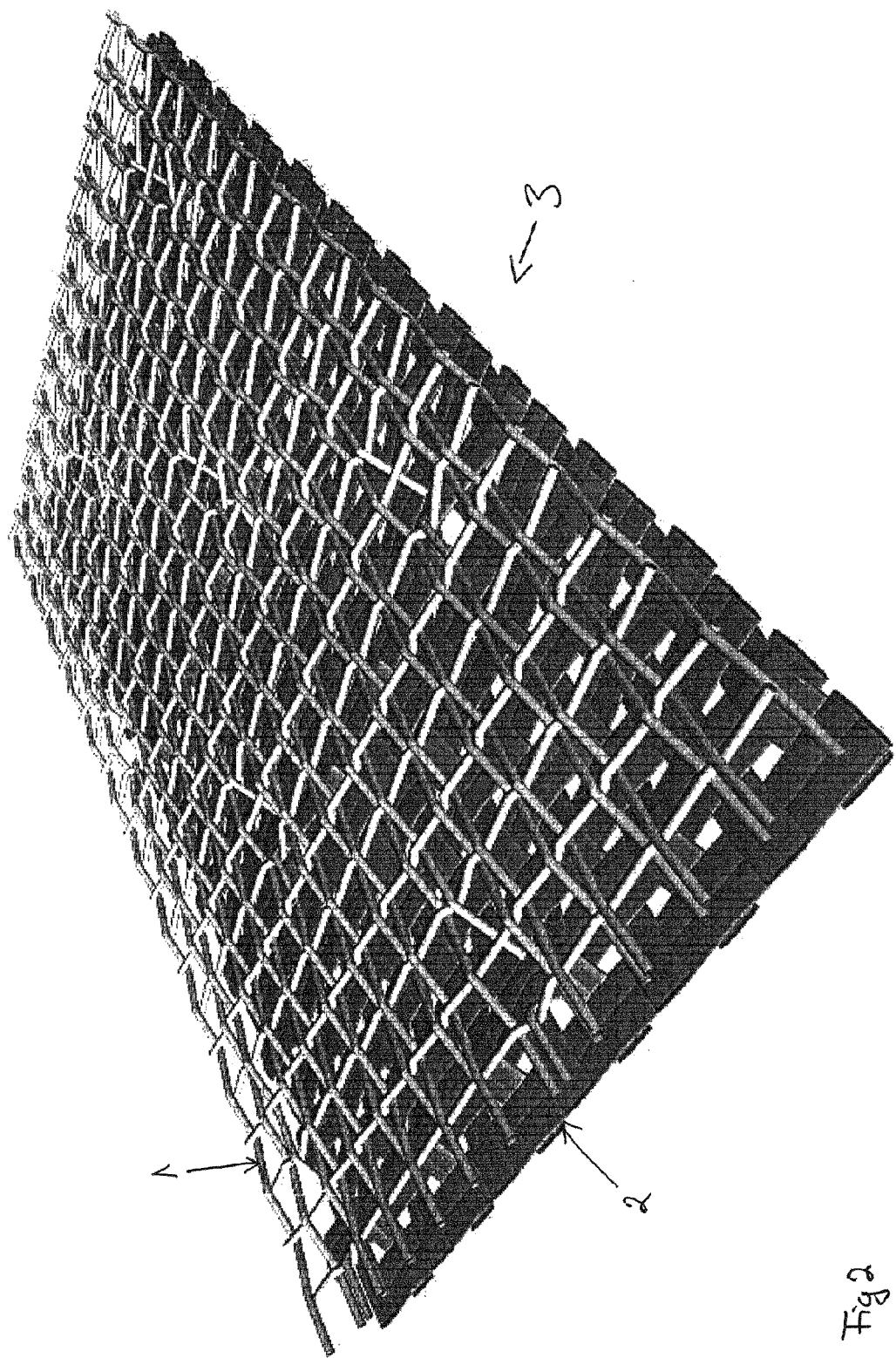

FIG. 2 also shows a three-dimensional representation of the double fabric 3 with a first fabric 1 and a second fabric 2.

Figure 3:
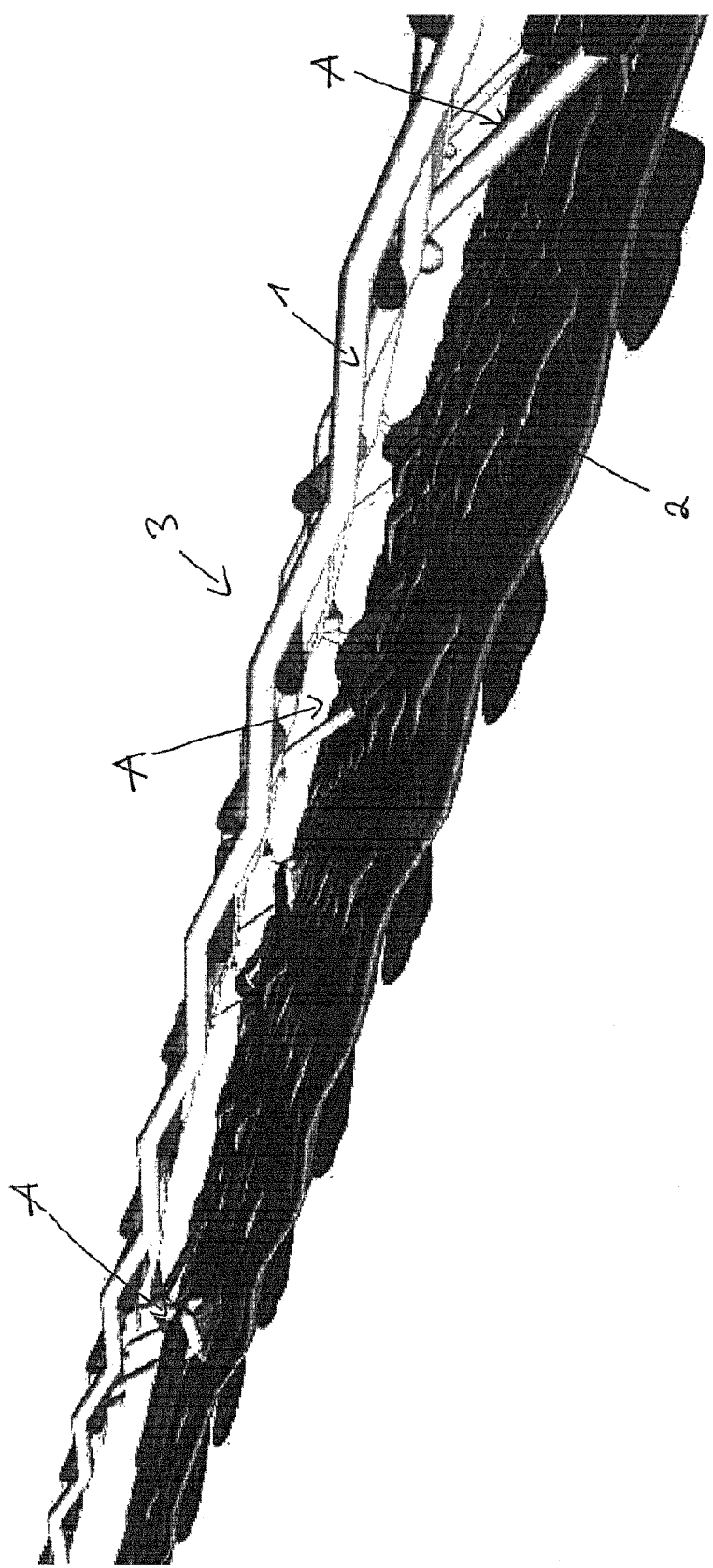

FIG. 3 shows schematically the double fabric 3, wherein the first fabric 1 is represented spaced apart from the second fabric 2 for better illustration. In this representation, it can be seen that threads of the first fabric layer 1 are woven with the second fabric 2 so that tying points A are formed between the first fabric 1 and the second fabric 2. It can also be clearly seen that despite the tying points A, there are two separate fabric layers 1, 2 and the threads of the first fabric 1 essentially do not lie in the fabric layer of the second fabric 2. The first fabric 1 thus lies on the second fabric 2 and is joined to the second fabric 2 via individual tying points A. 90% of the area of the first fabric 1 preferably lies on the second fabric 2. The first fabric 1 also lies preferably essentially parallel to the second fabric 2.

Figure 4:
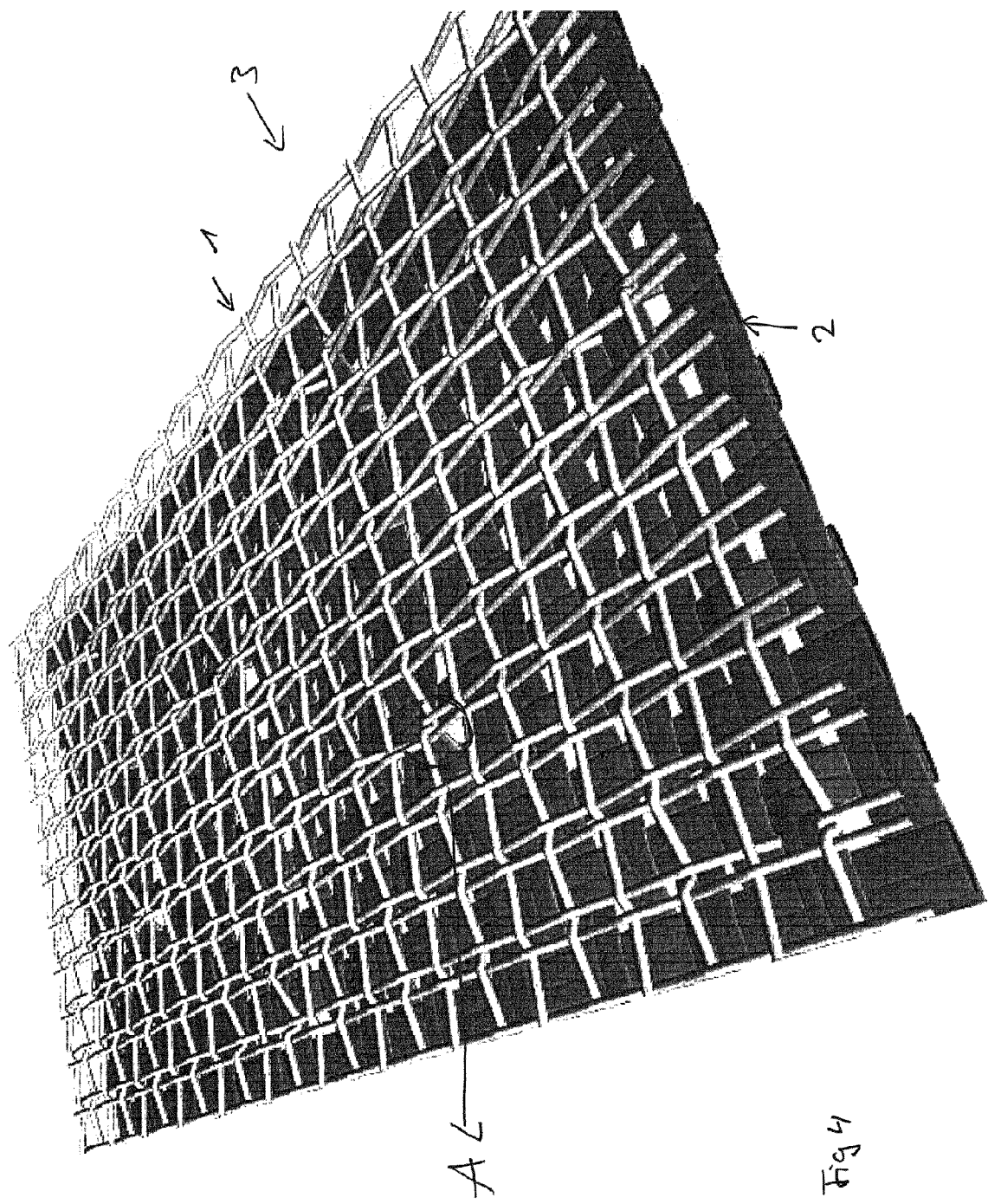

FIG. 4 shows a further representation of a double fabric layer 3.

Figure 5:
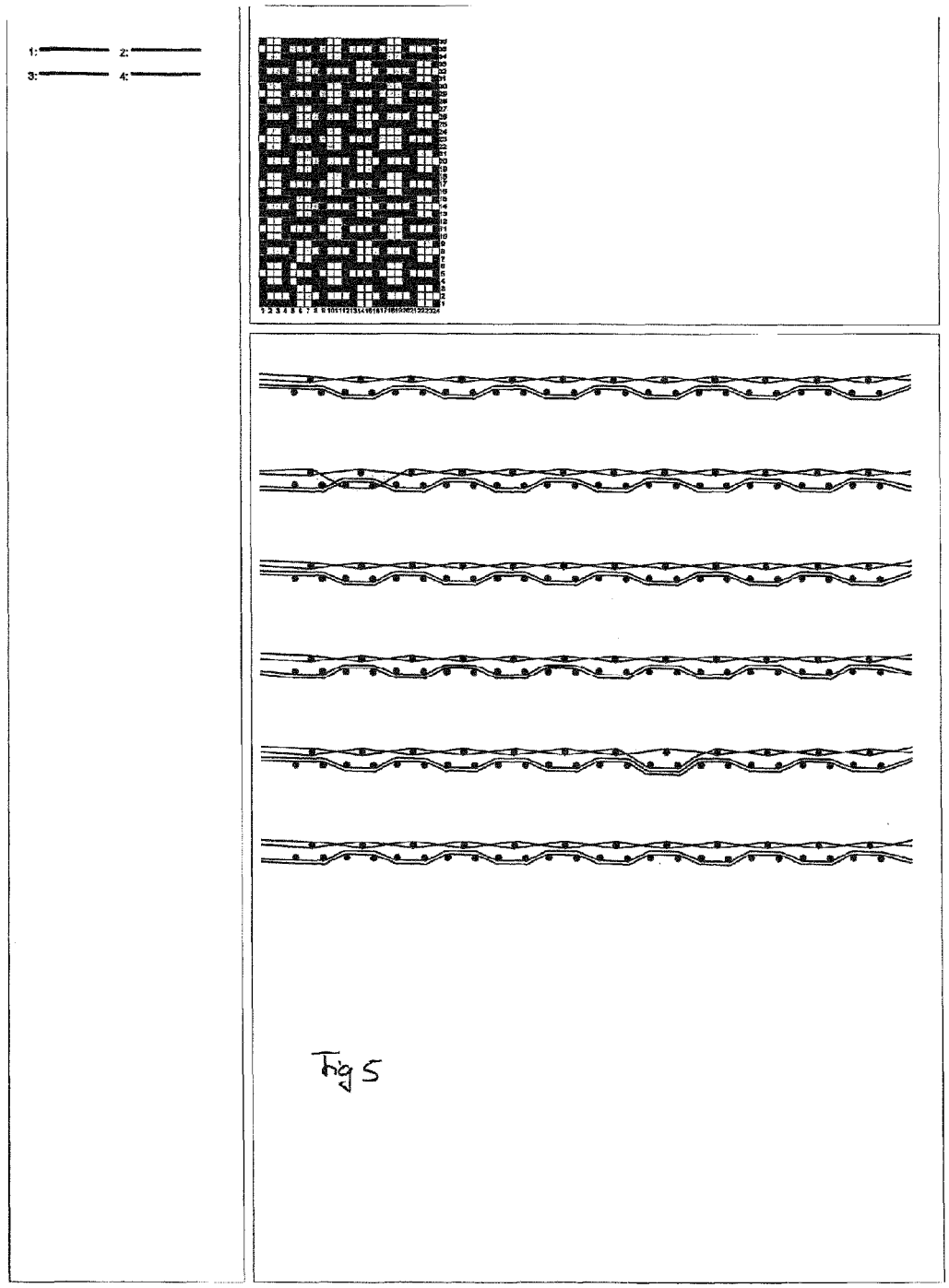
FIG. 5 shows a weave design of a double fabric with tying points.

FIG. 5 shows in the upper part of the figure a weave design and in the lower part of the Figure a representation of the weave in cross-section.

Figure 6:
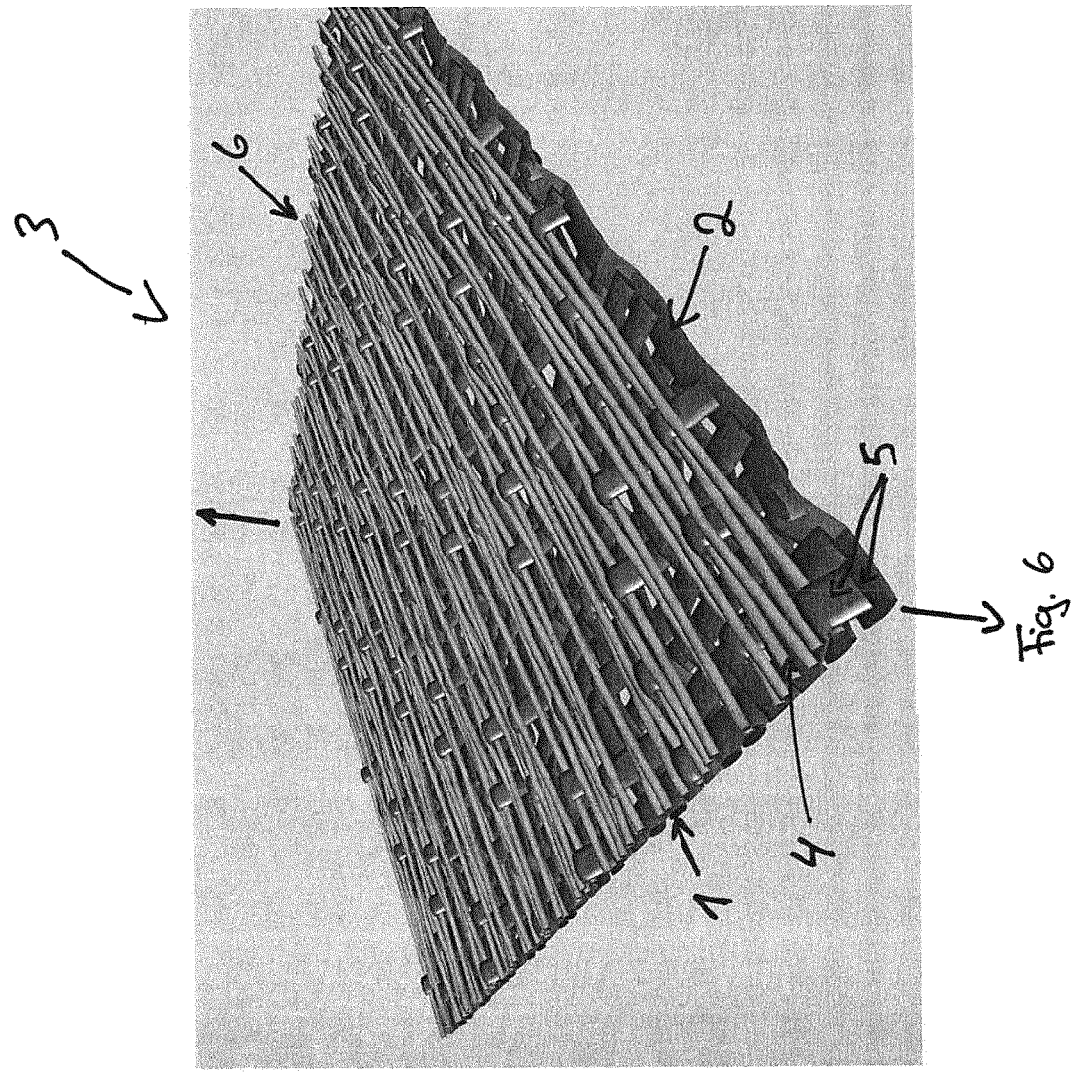
FIGS. 6-7 show schematically a further embodiment of a woven fabric structure.

FIG. 6 shows a further embodiment of the fabric structure 3. In this embodiment, the high-strength fibres 5 form a second woven fabric 2 on which thermoplastic fibres 4 lie. The thermoplastic fibres 4 form a non-crimp fabric layer 6 which—as shown in the example—can be a unidirectional non-crimp fabric layer. In the embodiment the second fabric layer has a hopsack weave. The thermoplastic fibres 4 are joined to the second fabric layer 2 by warp threads of the second fabric layer (i.e., by high-strength fibres 5). The connection between high-strength fibres 5 and thermoplastic fibres 4 also creates a type of woven fabric of thermoplastic fibres 4 and high-strength fibres 5 so that the term double fabric 3 also applies to this embodiment. The first woven fabric 1 is thereby formed by thermoplastic fibres 4 and high-strength fibres in warp, and the second woven fabric 2 is formed by high-strength fibres 5 in warp and weft. The connection between the thermoplastic fibres 4 and the second fabric 2 of high-strength fibres 5 is distributed symmetrically over the double fabric 3, as indicated by the arrow. As a result, the warp threads of the second fabric 2 essentially all have the same average take-up in the second fabric 2 as all the warp threads essentially have the same number of connections to the thermoplastic fibres 4.

Figure 7:
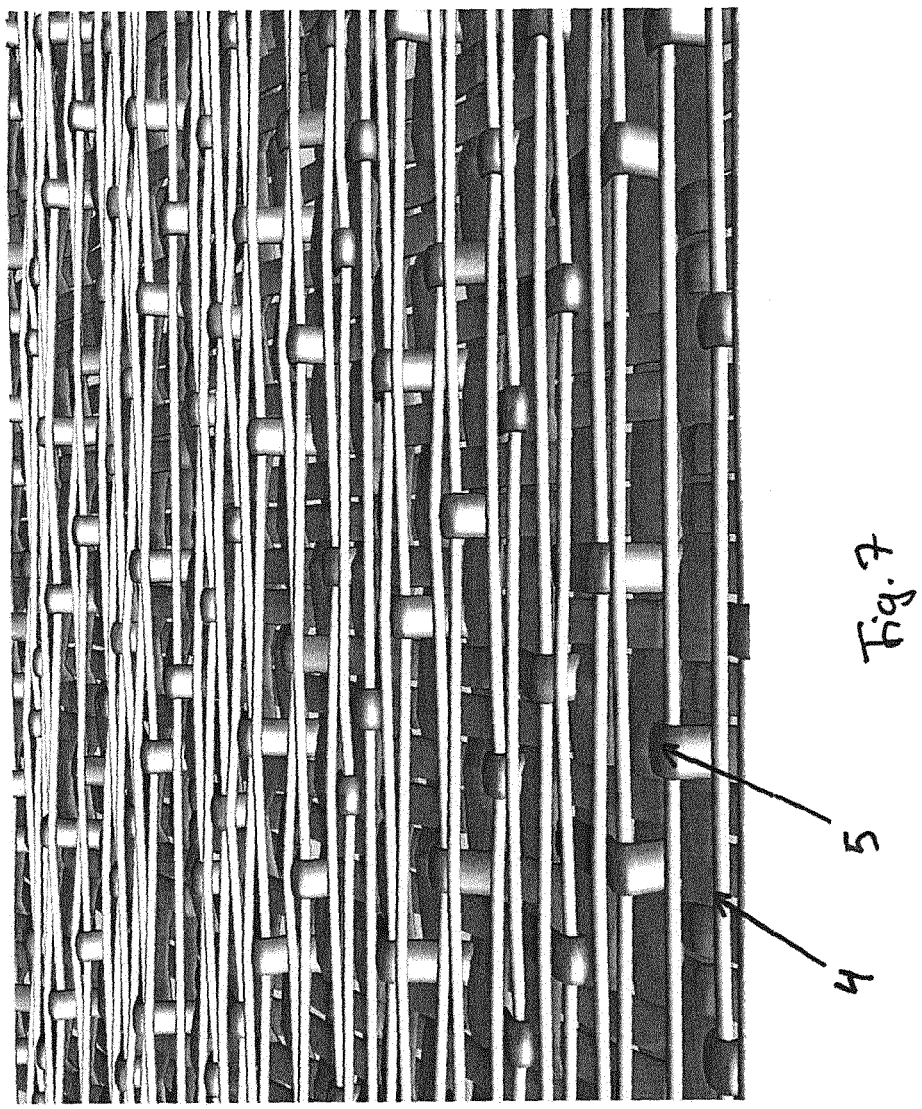

FIG. 7 shows schematically the embodiment from FIG. 6 in detail. The high-strength fibres 5 bind the thermoplastic fibres 4 to the second fabric 2 so that the woven fabric structure 3 is created.

LIST OF REFERENCE NUMERALS

A Tying point
1 First woven fabric (first fabric layer, thermoplastic fabric layer)
2 Second woven fabric (second fabric layer, high-strength fabric layer)
3 Double fabric
4 Thermoplastic fibres
5 High-strength fibres
6 Non-crimp fabric layer (thermoplastic fibres)

The invention claimed is:

1. Penetration-resistant article comprising at least a woven fabric structure having thermoplastic fibers and high-strength fibers, with the high-strength fibers having a strength of at least 1100 MPa in accordance with ASTM D-885, wherein the high-strength fibers are linked together to form a woven fabric of the woven fabric structure, wherein the thermoplastic fibers have a percentage by weight relative to the weight of the woven fabric structure of 5 to 35%, wherein the thermoplastic fibers are in the form of a non-crimp fabric and lie on the woven fabric, and are joined to the woven fabric by at least one warp thread and/or weft thread of the woven fabric of high-strength fibers and no additional joining thread or non-textile joining agent is provided for the connection between the woven fabric and the thermoplastic fibers.

2. Penetration-resistant article according to claim 1, wherein the thermoplastic fibers have a percentage by weight relative to the woven fabric structure of 10 to 15%.

3. Penetration-resistant article according to claim 1, wherein the high-strength fibers have a percentage by weight relative to the woven fabric structure of 65 to 95%.

4. Penetration-resistant article according to claim 1, wherein the woven fabric of high-strength fibers is joined together with the thermoplastic fibers at tying points, wherein an area of 100 cm$^2$ of the woven fabric structure has 20 to 150 tying points.

5. Penetration-resistant article according to claim 4, wherein an area of 100 cm$^2$ of the woven fabric structure has 30 to 50 tying points.

6. Penetration-resistant article according to claim 1, wherein the woven fabric of high-strength fibers has a fabric density according to Walz of over 30%.

7. Penetration-resistant article according to claim 1, wherein the thermoplastic fibers in the woven fabric structure are made of polyamide, polyester or polyurethane in the form of monofilaments and/or multifilaments.

8. Penetration-resistant article according to claim 1, wherein the high-strength fibers are aramid fibers, fibers of aramid copolymer, fibers of polyethylene with ultra-high molecular weight, fibers of polypropylene with ultra-high molecular weight, polybenzoxazole fibers and/or polybenzothiazole fibers.

9. Penetration-resistant article according to claim 1, wherein the warp and/or weft threads of the woven fabric of high-strength fibers have the same average take-up according to ISO 7211/3.

10. Penetration-resistant article according to claim 1, wherein the thermoplastic fibers have the form of a unidirectional non-crimp fabric.

11. Penetration-resistant article comprising at least a woven fabric structure having thermoplastic fibers and high-strength fibers, wherein the thermoplastic fibers have a percentage by weight relative to the weight of the woven fabric structure of 5 to 35%, wherein the high-strength fibers have a strength of at least 1100 MPa in accordance with ASTM D-885, and the high-strength fibers are joined together to form a woven fabric of the woven fabric structure, wherein the thermoplastic fibers are joined together to form a further woven fabric, wherein the further woven fabric of thermoplastic fibers lies on the woven fabric of high-strength fibers and is joined to the woven fabric of high-strength fibers by at least one warp and/or weft thread, wherein the woven fabric of high-strength fibers and the further woven fabric of thermoplastic fibers are each in themselves woven and no additional joining thread or non-textile joining agent is provided for the connection between the woven fabric and the thermoplastic fibers.

12. Penetration-resistant article according to claim 11, wherein the thermoplastic fibers have a percentage by weight relative to the woven fabric structure of 10 to 15%.

13. Penetration-resistant article according to claim 11, wherein the high-strength fibers have a percentage by weight relative to the woven fabric structure of 65 to 95%.

14. Penetration-resistant article according to claim 11, wherein the woven fabric of high-strength fibers is joined together with the thermoplastic fibers at tying points, wherein an area of 100 cm$^2$ of the woven fabric structure has 20 to 150 tying points.

15. Penetration-resistant article according to claim 14, wherein an area of 100 cm' of the woven fabric structure has 30 to 50 tying points.

16. Penetration-resistant article according to claim 11, wherein the woven fabric of high-strength fibers has a fabric density according to Walz of over 30%.

17. Penetration-resistant article according to claim 11, wherein the further woven fabric of thermoplastic fibers has a fabric density according to Walz of less than 30%.

18. Penetration-resistant article according to claim 11, wherein the thermoplastic fibers in the woven fabric structure are made of polyamide, polyester or polyurethane in the form of monofilaments and/or multifilaments.

19. Penetration-resistant article according to claim 11, wherein the high-strength fibers are aramid fibers, fibers of aramid copolymer, fibers of polyethylene with ultra-high molecular weight, fibers of polypropylene with ultra-high molecular weight, polybenzoxazole fibers and/or polybenzothiazole fibers.

20. Penetration-resistant article according to claim 11, wherein the warp and/or weft threads of the further woven fabric of thermoplastic fibers have the same average take-up according to ISO 7211/3 as the warp and/or weft threads of the fabric of high-strength fibers, or that the weft threads and warp threads of the fabric of high-strength fibers or of the further woven fabric of thermoplastic fibers have the same average take-up according to ISO 7211/3.

21. Method for producing a penetration-resistant article comprising at least a woven fabric structure according to claim 1, wherein the at least one woven fabric structure is compacted with at least one further textile layer under pressure and at a temperature equal to or higher than the melting point of the thermoplastic fiber and below the melting point of the high-strength fiber without pre-impregnation to form a sheet.

22. Method for producing a penetration-resistant article comprising at least a woven fabric structure according to claim 11, wherein the at least one woven fabric structure is compacted with at least one further textile layer under pressure and at a temperature equal to or higher than the melting point of the thermoplastic fiber and below the melting point of the high-strength fiber without pre-impregnation to form a sheet.

* * * * *